US009286275B2

(12) United States Patent
Khan

(10) Patent No.: US 9,286,275 B2
(45) Date of Patent: Mar. 15, 2016

(54) SYSTEM AND METHOD FOR AUTOMATICALLY GENERATING XML SCHEMA FOR VALIDATING XML INPUT DOCUMENTS

(75) Inventor: Ayub S. Khan, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1494 days.

(21) Appl. No.: 10/925,350

(22) Filed: Aug. 23, 2004

(65) Prior Publication Data

US 2006/0041838 A1  Feb. 23, 2006

(51) Int. Cl.
| G06F 17/00 | (2006.01) |
| G06F 17/22 | (2006.01) |
| G06F 17/30 | (2006.01) |
| G06F 17/27 | (2006.01) |

(52) U.S. Cl.
CPC .......... *G06F 17/227* (2013.01); *G06F 17/2247* (2013.01); *G06F 17/2725* (2013.01); *G06F 17/30908* (2013.01); *G06F 17/30914* (2013.01)

(58) Field of Classification Search
CPC ........................ G06F 17/2247; G06F 17/30914
USPC .................................................. 715/513, 234
See application file for complete search history.

(56) References Cited

U.S. PATENT DOCUMENTS

| 6,963,875 | B2* | 11/2005 | Moore et al. ................... 707/101 |
| 6,990,632 | B2* | 1/2006 | Rothchiller et al. ........... 715/212 |
| 6,993,714 | B2* | 1/2006 | Kaler et al. .................... 715/513 |
| 7,080,314 | B1* | 7/2006 | Garofalakis et al. .......... 715/236 |
| 7,134,072 | B1* | 11/2006 | Lovett et al. .................. 715/513 |
| 7,158,990 | B1* | 1/2007 | Guo et al. |
| 2002/0143727 | A1 | 10/2002 | Hu et al. |
| 2003/0149934 | A1* | 8/2003 | Worden ......................... 715/513 |
| 2004/0268234 | A1* | 12/2004 | Sampathkumar et al. ..... 715/513 |
| 2005/0055676 | A1* | 3/2005 | Bohlmann et al. ............. 717/136 |

FOREIGN PATENT DOCUMENTS

WO    03/060758 A3    7/2003

OTHER PUBLICATIONS

Garofalakis et al., "XTRACT: A System for Extracting Document Type Descriptors from XML Documents", MOD 2000, copyright ACM 2000, p. 165-176.*

Chidlovskii, et al., "Schema Extraction from XML: A Grammatical Inference Approach", 8th International Workshop on Knowledge Representation meets Databases, published Sep. 2001, p. 1-16.*

(Continued)

*Primary Examiner* — Amelia Tapp
(74) *Attorney, Agent, or Firm* — Polsinelli PC

(57) ABSTRACT

Techniques, systems and apparatus for automatically generating schema using an initial documents constructed in an XML compatible format are disclosed. A method involves providing an initial XML document that and analyzing the XML document to identify the XML data structures in the document and generating a data framework that corresponds to the data structure of the XML document. The data items of the initial XML document are analyzed to determine data constraints based on the data items of the initial XML. Schema are then generated based on the data framework generated and the data constraints determined from the raw xml data. These principles can be implemented as software operating on a computer system, as a computer module, as a computer program product and as a series of related devices and products.

18 Claims, 16 Drawing Sheets

(56) References Cited

OTHER PUBLICATIONS

Takase, et al., "XML Digital Signature System Independent of Existing Applications" Proceedings of the 2002 Symposium on Applications and the Internet, copyright 2002, IEEE, p. 1-8.*

Dushay, et al., "Analyzing Metadata for Effective Use and Re-Use", issued Oct. 2003, Dublin Core Metadata Initiative, p. 1-10.*

Chidlovskii, et al., "Using Regular Tree Automata as XML schemas", copyright 2000, IEEE, p. 1-10.*

Rodriguez-Gianolli, et al., "A Semantic Approach to XML-based Data Integration", ER 2001, LNCS 2224, pp. 117-132, 2001.*

Jingkun Hu, "Visual Modeling of XML Constraints Based on a New Extensible Constraint Markup Language", School of Computer Science and Information Systems, Pace University, 2004, pp. 1-118.

William M. Shui and Raymond K. Wong, "Application of XML Schema and Active Rules System in Management and Integration of Heterogeneous Biological Data", Proceedings of the Third IEEE Symposium on BioInformatics and BioEngineering, 2003, 8 pages.

International Search Report, dated Nov. 4, 2005.

* cited by examiner

Structure Analyzer XML Stylesheet
------------------------------------------------------------------

```
<xsl:stylesheet xmlns:xsl=http://www.w3.org/1999/XSL/Transform version="1.0">
  <xsl:output method="xml" indent="yes"/>

<xsl:template match="/">
    <xsl:call-template name="process-all-category-children">
      <xsl:with-param name="children" select="*"/>
    </xsl:call-template>
  </xsl:template>

<xsl:template name="process-all-category-children">
    <xsl:param name="children"/>

<xsl:if test="count($children) > 0">
      <xsl:variable name="first-child" select="local-name($children[1])"/>

<xsl:call-template name="process-like-siblings">
        <xsl:with-param name="siblings" select="$children[local-name(.) = $first-child]"/>
      </xsl:call-template>

<xsl:call-template name="process-all-category-children">
        <xsl:with-param name="children" select="$children[local-name(.) != $first-child]"/>
      </xsl:call-template>
    </xsl:if>
  </xsl:template>

<!-- Pickup only the first sibling from the set of children for a node-->
  <xsl:template name="process-like-siblings">
    <xsl:param name="siblings"/>

<xsl:variable name="category-name" select="$siblings[1]/@name"/>
    <xsl:variable name="el-name" select="local-name($siblings[1])"/>

<xsl:element name="{$el-name}">

<xsl:for-each select="$siblings[1]/@*">
        <xsl:variable name="attr-name" select="."/>
        <xsl:attribute name="{local-name()}"><xsl:value-of select="$attr-name"/></xsl:attribute>

<xsl:attribute name="XSG_attrcount_{local-name()}"><xsl:value-of
  select="count($siblings/@*)"/></xsl:attribute>
          </xsl:for-each>

<xsl:variable name="count"
  select="count($siblings[1]/../*[local-name() =
  local-name($siblings[1])])"/>
            <xsl:variable name="child_count" select="count($siblings/*)"/>

<xsl:if test="$child_count = 0">
```

*FIG. 5.1*

```
        <xsl:attribute name="XSG_val"><xsl:value-of select="$siblings[1]"/></xsl:attribute>
      </xsl:if>

<xsl:attribute name="XSG_count"><xsl:value-of
select="$count"/></xsl:attribute>

<xsl:call-template name="process-all-category-children">
         <xsl:with-param name="children" select="$siblings/*"/>
      </xsl:call-template>

</xsl:element>
  </xsl:template>

</xsl:stylesheet>
```

*FIG. 5.2*

Example Default Constraint Generator XML Style Sheet
--------------------------------------------------------------------------

```
> <xsl:stylesheet xmlns:xsl="http://www.w3.org/1999/XSL/Transform"
>       xmlns:java="http://xml.apache.org/xalan/java"
> version="1.0">
> <xsl:output method="xml" indent="yes"/>
>
> <!-- root node-->
>   <xsl:template match="/">
>   <root>
>     <namespaces>
>       <namespace name="xmlns:jaxb"
> value="http://java.sun.com/xml/ns/jaxb"/>
>     </namespaces>
>
>     <constraints>
>     <xsl:for-each select="*">
>
>       <xsl:variable name="el-name" select="local-name(.)"/>
>       <xsl:variable name="new-path" select="concat('/', $el-name)"/>
>
>       <xsl:variable name="elem-val" select="./@XSG_val"/>
>       <xsl:if test="string-length($elem-val) > 0">
>         <xsl:call-template name="gen-constraint">
>         <xsl:with-param name="name" select="local-name(.)"/>
>         <xsl:with-param name="path" select="$new-path"/>
>         <xsl:with-param name="type" select="'elem'"/>
>         <xsl:with-param name="val" select="$elem-val"/>
>         </xsl:call-template>
>       </xsl:if>
>
>       <xsl:for-each select="./@*">
> <!-- do not process if node has XSG attributes-->
>         <xsl:if test="not(contains(local-name(.), 'XSG_'))">
>         <xsl:variable name="attr-val" select="."/>
>          <xsl:call-template name="gen-constraint">
>         <xsl:with-param name="name" select="local-name(.)"/>
>         <xsl:with-param name="path" select="$new-path"/>
>         <xsl:with-param name="type" select="'attr'"/>
>         <xsl:with-param name="val" select="$attr-val"/>
>          </xsl:call-template>
>         </xsl:if>
>       </xsl:for-each>
>       <xsl:call-template name="process-all-children">
>       <xsl:with-param name="children" select="./*"/>
>       <xsl:with-param name="path" select="$new-path"/>
>       </xsl:call-template>
>     </xsl:for-each>
>     </constraints>
```

*FIG. 7.1*

```
>       <inserts>
>         <insert name="comment_def" path="/">
>         <xsd_element name="comment" type="xsd:string"/>
>
>         </insert>
>       </inserts>
>
>    </root>
>  </xsl:template>
>
> <!-- process all children -->
>   <xsl:template name="process-all-children">
>     <xsl:param name="children"/>
>     <xsl:param name="path"/>
> <!-- process if node has children-->
>     <xsl:if test="count($children) > 0">
> <!-- create a xsd:complexType tag-->
>
> <!-- call template to process other siblings-->
>     <xsl:for-each select="$children">
>       <xsl:variable name="el-name" select="local-name(.)"/>
>       <xsl:variable name="new-path" select="concat($path, '/',
> $el-name)"/>
>
>       <xsl:variable name="elem-val" select="./@XSG_val"/>
>       <xsl:if test="string-length($elem-val) > 0">
>        <xsl:call-template name="gen-constraint">
>       <xsl:with-param name="name" select="local-name(.)"/>
>       <xsl:with-param name="path" select="$new-path"/>
>       <xsl:with-param name="type" select="'elem'"/>
>       <xsl:with-param name="val" select="$elem-val"/>
>         </xsl:call-template>
>       </xsl:if>
>
>       <xsl:call-template name="process-all-children">
>     <xsl:with-param name="children" select="./*"/>
>     <xsl:with-param name="path" select="$new-path"/>
>       </xsl:call-template>
>
>
>     </xsl:for-each>
> <!-- end call template to process other siblings-->
>     </xsl:if>
> <!-- end process if node has children-->
>   </xsl:template>
```

*FIG. 7.2*

```
> <xsl:template name="gen-constraint">
>   <xsl:param name="name"/>
>   <xsl:param name="path"/>
>   <xsl:param name="type"/>
>   <xsl:param name="val"/>
>   <xsl:variable name="datatype"><xsl:value-of
> select="java:DataType.getType($name,$val)"/></xsl:variable>
>       <xsl:element name="constraint">
>           <xsl:attribute name="type"><xsl:value-of
> select="$type"/></xsl:attribute>
>           <xsl:attribute name="name"><xsl:value-of
> select="$name"/></xsl:attribute>
>           <xsl:attribute name="path"><xsl:value-of
> select="$path"/></xsl:attribute>
>           <datatype>
>           <xsl:attribute name="type"><xsl:value-of
> select="$datatype"/></xsl:attribute>
>           </datatype>
>       </xsl:element>
> </xsl:template>
>
> </xsl:stylesheet>
```

*FIG. 7.3*

```
Process for Generating Schema
> ----------------------------------------------------------------
> <xsl:stylesheet xmlns:xsl="http://www.w3.org/1999/XSL/Transform"
>       xmlns:java="http://xml.apache.org/xalan/java"
>   version="1.0">
>  <xsl:output method="xml" indent="yes"/>
>  <xsl:param name="constraint-document" />
>  <!-- root node-->
>   <xsl:template match="/">
>
>     <xsl:element name="xsd_schema">
>     <xsl:attribute
> name="xmlns_xsd">http://www.w3.org/2001/XMLSchema</xsl:attribute>
>
>     <xsl:variable name="namespaces"
> select="document(normalize-space($constraint-document))/root/namespaces/namespace"/>
>
>     <xsl:variable name="xmlns_jaxb" select="$namespaces[@name =
> 'xmlns_jaxb']/@value"/>
>     <xsl:if test="string-length($xmlns_jaxb) > 0">
>       <xsl:attribute name="xmlns_jaxb"><xsl:value-of
> select="$xmlns_jaxb"/></xsl:attribute>
>     </xsl:if>
>
>     <xsl:variable name="xmlns_xjc" select="$namespaces[@name =
> 'xmlns_xjc']/@value"/>
>     <xsl:if test="string-length($xmlns_xjc) > 0">
>       <xsl:attribute name="xmlns_xjc"><xsl:value-of
> select="$xmlns_xjc"/></xsl:attribute>
>     </xsl:if>
>
>     <xsl:variable name="jaxb_version" select="$namespaces[@name =
> 'jaxb_version']/@value"/>
>     <xsl:if test="string-length($jaxb_version) > 0">
>       <xsl:attribute name="jaxb_version"><xsl:value-of
> select="$jaxb_version"/></xsl:attribute>
>     </xsl:if>
>
>     <xsl:variable name="jaxb_extensionBindingPrefixes"
> select="$namespaces[@name = 'jaxb_extensionBindingPrefixes']/@value"/>
>     <xsl:if test="string-length($jaxb_extensionBindingPrefixes) > 0">
>       <xsl:attribute
> name="jaxb_extensionBindingPrefixes"><xsl:value-of
> select="$jaxb_extensionBindingPrefixes"/></xsl:attribute>
>     </xsl:if>
>
>     <xsl:copy-of
> select="document(normalize-space($constraint-document))/root/inserts/insert[@path
> = '/']/*"/>
```

*FIG. 9.1*

```
>     <xsl:for-each select="*">
>       <xsl:element name="xsd_element">
>         <xsl:attribute name="name"><xsl:value-of
> select="local-name(.)"/></xsl:attribute>
>         <xsl:if test="count(./*) > 0">
>           <xsl:attribute name="type">XSG_<xsl:value-of
> select="local-name(.)"/></xsl:attribute>
>         </xsl:if>
>         <xsl:if test="count(./*) = 0">
>           <xsl:attribute name="type">xsd:string</xsl:attribute>
>         </xsl:if>
>       </xsl:element>
>     </xsl:for-each>
>
>     <xsl:for-each select="*">
>      <xsl:variable name="el-name" select="local-name(.)"/>
>      <xsl:variable name="new-path" select="concat('/', $el-name)"/>
>      <xsl:call-template name="process-all-children">
>     <xsl:with-param name="children" select="./*"/>
>     <xsl:with-param name="path" select="$new-path"/>
>      </xsl:call-template>
>     </xsl:for-each>
>
>         <xsl:variable name="attr-constraints"
> select="document(normalize-space($constraint-document))/root/constraints/
constraint[@type='attr']"/>
>         <xsl:variable name="attr-constraints-refs"
> select="$attr-constraints/datatype[@type='ref']"/>
>         <xsl:copy-of select="$attr-constraints-refs/*"/>
>
> </xsl:element>
>
>  </xsl:template>
>
> <!-- process all children -->
>   <xsl:template name="process-all-children">
>     <xsl:param name="children"/>
>     <xsl:param name="path"/>
> <!-- process if node has children-->
>     <xsl:if test="count($children) > 0">
> <!-- create a xsd:complexType tag-->
>     <xsl:element name="xsd_complexType">
>       <xsl:attribute name="name">XSG_<xsl:value-of
> select="local-name($children[1]/..)"/></xsl:attribute>
>       <xsl:element name="xsd_sequence">
> <!-- call template to process like siblings-->
>         <xsl:call-template name="process-like-siblings">
>         <xsl:with-param name="siblings" select="$children"/>
>         <xsl:with-param name="path" select="$path"/>
```

*FIG. 9.2*

```
>       </xsl:call-template>
>       <xsl:copy-of
> select="document(normalize-space($constraint-document))/root/inserts/insert[@path
> = $path]/*"/>
>       </xsl:element>
> <!-- create attributes for each xsd:complexType tag-->
>     <xsl:for-each select="./@*">
>       <xsl:variable name="attr_name" select="local-name(.)"/>
>       <xsl:variable name="attr_val" select="."/>
>       <xsl:if test="not(contains($attr_name,'XSG_'))">
>       <xsl:element name="xsd_attribute">
>       <xsl:attribute name="name"><xsl:value-of
> select="$attr_name"/></xsl:attribute>
>       <xsl:variable name="attr_type" select="xsd_date"/>
>       <xsl:variable name="attr-constraints"
> select="document(normalize-space($constraint-document))/root/constraints/
constraint[@type='attr']"/>
>       <xsl:variable name="constraint-path"
> select="$attr-constraints[@path=string($path)]"/>
>       <xsl:variable name="constraint-path-val"
> select="$constraint-path/@path"/>
>       <xsl:variable name="constraint-attr-name"
> select="$constraint-path/@name"/>
>       <xsl:variable name="datatype"
> select="$constraint-path/datatype/@type"/>
>       <xsl:variable name="dataname"
> select="$constraint-path/datatype/@name"/>
>       <xsl:if test="($attr_name = $constraint-attr-name)">
>         <xsl:attribute name="type"><xsl:value-of
> select='$datatype'/></xsl:attribute>
>       </xsl:if>
>
>       <xsl:if test="$datatype = 'ref'">
>         <xsl:attribute name="type"><xsl:value-of
> select='$dataname'/></xsl:attribute>
>       </xsl:if>
>
>
>       <xsl:if test="not($attr_name = $constraint-attr-name)">
>         <xsl:attribute name="type"><xsl:value-of
> select="java:DataType.getType($attr_name,$attr_val)"/></xsl:attribute>
>       </xsl:if>
```

*FIG. 9.3*

```
          <xsl:if test="string-length('$attr_val') > 0">
>           <xsl:attribute name="use">required</xsl:attribute>
>         </xsl:if>
>       </xsl:element>
>     </xsl:if>
>     </xsl:for-each>
>   </xsl:element>
> <!-- end create xsd:complexType tag-->
>
> <!-- call template to process other siblings-->
>     <xsl:for-each select="$children">
>       <xsl:variable name="el-name" select="local-name(.)"/>
>       <xsl:variable name="new-path" select="concat($path, '/',
> $el-name)"/>
>       <xsl:call-template name="process-all-children">
>       <xsl:with-param name="children" select="./*"/>
>       <xsl:with-param name="path" select="$new-path"/>
>       </xsl:call-template>
>     </xsl:for-each>
> <!-- end call template to process other siblings-->
>     </xsl:if>
> <!-- end process if node has children-->
>   </xsl:template>
>
> <!-- process like siblings-->
>   <xsl:template name="process-like-siblings">
>     <xsl:param name="siblings"/>
>     <xsl:param name="path"/>
>     <xsl:variable name="category-name" select="$siblings[1]/@name"/>
> <!-- create xsd:element tag for each siblings-->
>     <xsl:for-each select="$siblings">
>       <xsl:variable name="el-name" select="local-name(.)"/>
>       <xsl:variable name="new-path" select="concat($path, '/',
> $el-name)"/>
>       <xsl:element name="xsd_element">
>         <xsl:attribute name="name"><xsl:value-of
> select="local-name(.)"/></xsl:attribute>
>         <xsl:if test="count(./*) > 0">
>         <xsl:attribute name="type">XSG_<xsl:value-of
> select="local-name(.)"/></xsl:attribute>
>         <xsl:variable name="count" select="$siblings[1]/@XSG_count"/>
>         <xsl:if test="number($count) > 1">
>          <xsl:attribute name="minOccurs">1</xsl:attribute>
>          <xsl:attribute name="maxOccurs">unbounded</xsl:attribute>
>         </xsl:if>
>         </xsl:if>
>         <xsl:variable name="elem-constraints"
```

*FIG. 9.4*

```
> select="document(normalize-space($constraint-document))/root/constraints/
constraint[@type='elem']"/>
>        <xsl:variable name="constraint-path"
> select="$elem-constraints[@path=string($new-path)]"/>
>        <xsl:variable name="constraint-path-val"
> select="$constraint-path/@path"/>
>        <xsl:variable name="constraint-attr-name"
> select="$constraint-path/@name"/>
>
>        <xsl:if test="count(./*) = 0">
>           <xsl:if test="$constraint-path-val = $new-path">
>              <xsl:variable name="datatype"
> select="$constraint-path/datatype/@type"/>
>
>              <xsl:if test="$datatype = 'local'">
>                 <!--<xsl:attribute name="type"><xsl:value-of
> select='$datatype'/></xsl:attribute>-->
>                 <xsl:copy-of select="$constraint-path/datatype/*"/>
>              </xsl:if>
>
>              <xsl:if test="starts-with($datatype, 'xsd:')">
>                 <xsl:attribute name="type"><xsl:value-of
> select='$datatype'/></xsl:attribute>
>
>              <xsl:variable name="xsg_val" select="./@XSG_val"/>
>                 <xsl:if test="not($constraint-path-val = $new-path)">
>                 <xsl:attribute name="type"><xsl:value-of
> select="java:DataType.getType($el-name,$xsg_val)"/></xsl:attribute>
>              </xsl:if>
>              </xsl:if>
>           </xsl:if>
>        </xsl:if>
>        </xsl:element>
>     </xsl:for-each>
> <!-- end create xsd:element tag for each siblings-->
>    </xsl:template>
>
> </xsl:stylesheet>
```

*FIG. 9.5*

SYSTEM AND METHOD FOR AUTOMATICALLY GENERATING XML SCHEMA FOR VALIDATING XML INPUT DOCUMENTS

BACKGROUND OF THE INVENTION

XML (EXtensible Markup Language) is a self-descriptive markup language that is finding ever wider application as a data transmission and processing tool. XML is efficient at describing and defining data and is therefore used ever increasingly in data intensive applications. In this way XML is different from HTML, which was designed for displaying data.

XML data can be readily transmitted between computers using any type of data transmission media. This XML data can be processed using computer programs and other suitably configured applications. Commonly, an XML file is received by an application and processed to generate an output. For example, in one implementation, XML can be used to provide inventory information. Such information can be provided in the form of an XML compliant document (referred to herein as and XML document of xml.doc). In one implementation, such information could, for example, be formatted as follows:

```
<Camera>
    <name>Canon-Sure-Shot-Z155</name>
    <f-stop>4.8–11.7</f-stop>
    <focal length>37–155mm zoom</ focal length >
    <cost>$318.00USD</cost>
</Camera>
```

This simplified example of an XML document provides an illustration of inventory information relating to a camera. In an XML document, the data items are formatted as parts of XML elements, with XML documents containing one or more such elements. In XML, a data item is "wrapped" between start/end tags to form an XML element. For example, a start tag "<name>" and an end tag "</name>" wrap the data element "Canon-Sure-Shot-Z155" to form an XML element "<name>Canon-Sure-Shot-Z155</name>".

A more complex element can be defined using, for example, an element defined by <camera> . . . </camera>. Methods and formats used to describe XML data are, of course, well known to those having ordinary skill in the art and so will not be discussed in detail here.

Using the above-described example, the XML information conforms to an XML data structure. As used here, an XML data structure refers to the arrangement and organizational format of "empty" data elements. Such structure is defined by the arrangement and format that defines the relationship of elements to each other within a given XML document. Again, using the above-described example, the structure of the XML document can be formatted as follows:

```
<Camera>
    <name> ... </name>
    <f-stop> ... </f-stop>
    <focal length> ... </ focal length >
    <cost> ... </cost>
</Camera>
```

The foregoing simplified example defines an example data framework that defines a data structure for the example document.

In many implementations, XML documents are used to provide data to applications that perform various operations using the XML data. Commonly, such applications are configured to receive the XML data in a given order and having a specified format. If the data is provided in an incorrect order or having an improper format, it may be unusable by an application. Improperly configured XML data can cause application programs to fail or crash or cause other undesirable outcomes. Under such circumstances the XML document (and associated data) are considered "invalid". Consequently, applications are commonly equipped with small programs that "validate" received XML documents. If the XML documents contain XML data in the proper order and of the correct format it is said to be valid and the application can operate on the data. One approach used to validate XML documents is to use an XML schema (also referred to as .xsd files) to validate the XML data. The validation schema can be included as part of the application or used as an add-on validation module. XML schema are used to describe the structure of XML documents. As is known to those having ordinary skill in the art, XML schema are useful for defining elements or attributes that can appear in a document. XML schema can be used to define whether elements are child elements and the number and order of child elements. XML schema can also define whether an element is empty or can include text and can also define data types for elements and attributes as well as defining default and fixed values for elements and attributes. These attributes are quite useful for defining and validating XML documents.

However, in common usage, the data and structure of XML documents are constantly changing. Additionally, each change of data or structure typically necessitates a corresponding change in the associated XML schema. In the current art, such schema must be changed or rewritten by hand to implement the changes. In the short example provided herein above such changes may be relatively simple to effectuate. However, most validation schema are very long with many elements and the process of carefully and accurately generating suitable schema can be extremely time consuming. Using conventional processes generating accurate schema capable of validating XML documents is a laborious, meticulous, and time consuming process.

SUMMARY OF THE INVENTION

Broadly speaking, the invention relates to techniques, systems and apparatus for automatically generating schema without the need for recoding by hand. In particular, embodiments of the invention can automatically generate schema using an initial documents constructed in an XML compatible format.

The invention can be implemented in numerous ways, including a system, an software module, a method, or a computer readable medium as well as other implementations. Several embodiments of the invention are discussed below.

One embodiment of the invention is directed to a method for generating XML schema. Such method involves the operations of providing an initial XML document that includes raw XML data comprising data items arranged in XML data elements and analyzing the XML document to identify XML data structures and therefrom generating a data framework that corresponds to the format of the data structures in the XML document. The method involves analyzing the data items of the initial XML document to determine data constraints based on the data items. XML schema are then generated based on the data framework generated and the data constraints determined from the raw xml data.

In another embodiment, the disclosure teaches a computer program product embodied in a computer readable media that includes code for generating XML schema. The computer program product includes code for receiving an initial XML document that that includes raw XML data comprising data items arranged in XML data structures. The product includes code for analyzing the XML document to identify the XML data structures. The program code generates a data framework associated with the format of the data structures in the XML document and includes code for analyzing data items from the initial XML document and determining XML data constraints based on the data items. The code also includes instructions for generating XML schema based on the data framework generated and the XML data constraints determined from the data items.

In another embodiment the principles of the present invention enable a computer system. The computer system including at least one central processing unit (CPU), memory, and user interface in combination configured to include an XML structure analyzer for analyzing a received initial XML document, wherein said analyzing includes identifying the XML data elements of the initial XML document and generating a data framework associated with a data structure for the XML data elements of the initial XML document. Additionally, the system includes a default constraint generator for analyzing the raw XML data from the initial XML document and determining XML data constraints for data items based on the XML raw data. The system includes a data constraint merger for receiving at least one of the XML data constraints from the data constraint generator and a set of externally supplied data constraints and for outputting a final data constraint file that is input into a system XML schema generator that receives the data structures from the XML structure analyzer and final data constraint file from the data constraint merger and generates an XML schema associated with said data structures and final data constraint file.

In another embodiment, a computer module is disclosed. The module comprising an XML structure analyzer for analyzing a received initial XML document that includes raw XML data comprising data items arranged in XML data elements, wherein said analyzing includes identifying the XML data elements of the initial XML document and generating a data framework associated with a data structure for the XML data elements of the initial XML document. The module further includes a default constraint generator for analyzing the raw XML data from the initial XML document and determining XML data constraints for data items based on the XML raw data. A data constraint merger is included for receiving at least one of the XML data constraints from the data constraint generator and a set of externally supplied data constraints and for outputting a final data constraint file. Also, an XML schema generator is included for receiving the data structures from the XML structure analyzer and final data constraint file from the data constraint merger and generating an XML schema associated with said data structures and final data constraint file.

In another embodiment, another module is disclosed. This module includes an XML structure analyzer for analyzing a received initial XML document that includes raw XML data comprising data items arranged in XML data elements, wherein said analyzing includes identifying the XML data elements of the initial XML document and generating a data framework associated with a data structure for the XML data elements of the initial XML document. The module further includes a default constraint generator for analyzing the raw XML data from the initial XML document and determining XML data constraints for data items based on the XML raw data. An XML schema generator is included for receiving the data structures from the XML structure analyzer and default data constraint file from the default constraint generator and generating therefrom an XML schema associated with said data structures and final data constraint file.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5.1-5.2 depicts a method embodiment enabling a structure analyzer implemented as an XSLT spreadsheet in accordance with the principles of the invention.

FIG. 7.1-7.3 depicts a method embodiment enabling default constraint generation implemented as an XSLT spreadsheet in accordance with the principles of the invention.

FIG. 9.1-9.5 depicts a method embodiment enabling XML schema generation implemented as an XSLT spreadsheet in accordance with the principles of the invention.

DETAILED DESCRIPTION OF THE INVENTION

The invention relates to techniques, systems, and modules for automatically generating XML schema capable of use for validating XML documents. Embodiments of the invention are discussed below with reference to FIGS. 1-10B. However, those skilled in the art will readily appreciate that the detailed description given herein with respect to these figures is for explanatory purposes as the invention extends beyond these limited embodiments.

Figure 1:
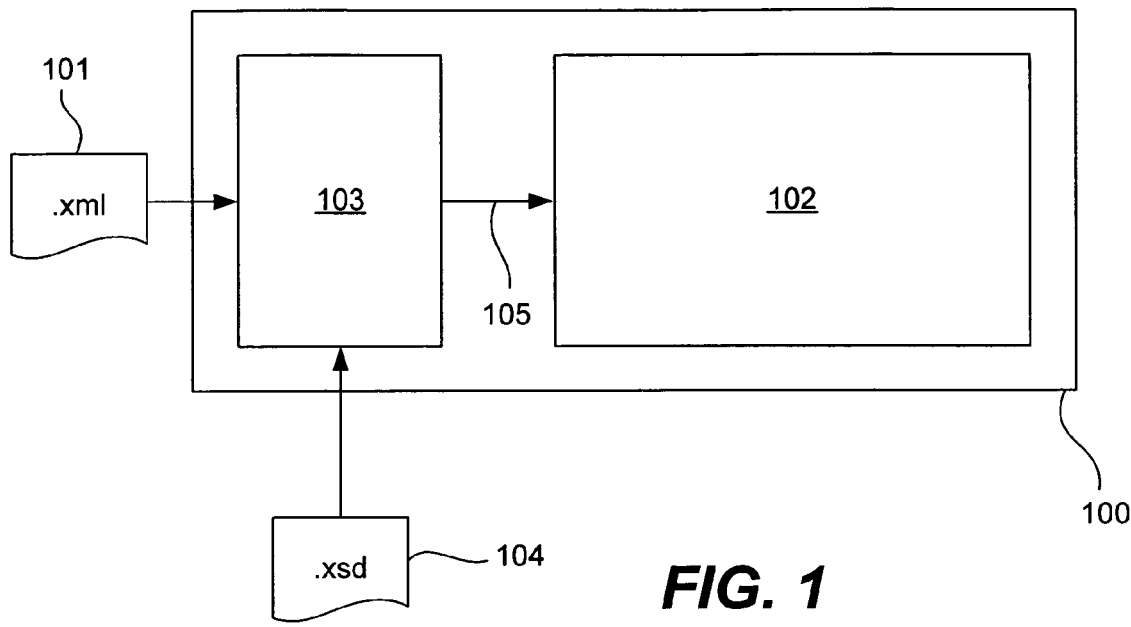
FIG. 1 is a simplified block diagram illustrating an example application program suitable for executing an XML schema generated in accordance with the principles of the invention.

In accordance with one aspect of the invention a typical application for implementing an XML schema is described. FIG. 1 is a simplified block diagram illustrating an application program 100 for use in accordance with the principles of the invention. The program 100 includes an example process 102 for operating on XML documents 101 supplied to the program 100. In the depicted embodiment a validator 103 (e.g., a validation program) is used to validate XML documents 101 provided to the program 100. The validator 103 compares the data structure and the format of the data elements of the XML document 101 with an XML schema 104 (also provided to the validator) to determine if the structure and format of the content of the XML document 101 is "valid" (i.e., correctly configured and structured) to operate in the process 102. Generally, this means that the structure and format of the content of the XML document 101 matches that of the XML schema 104. The validator 103 outputs a valid XML document 105. The inventor notes that although the depicted validator 103 forms part of the program 100, this need not be the case. A validator 103 can be separate from the process 102. The validator 103 simply provides the validated XML file 105 to the process 102.

Figure 2:
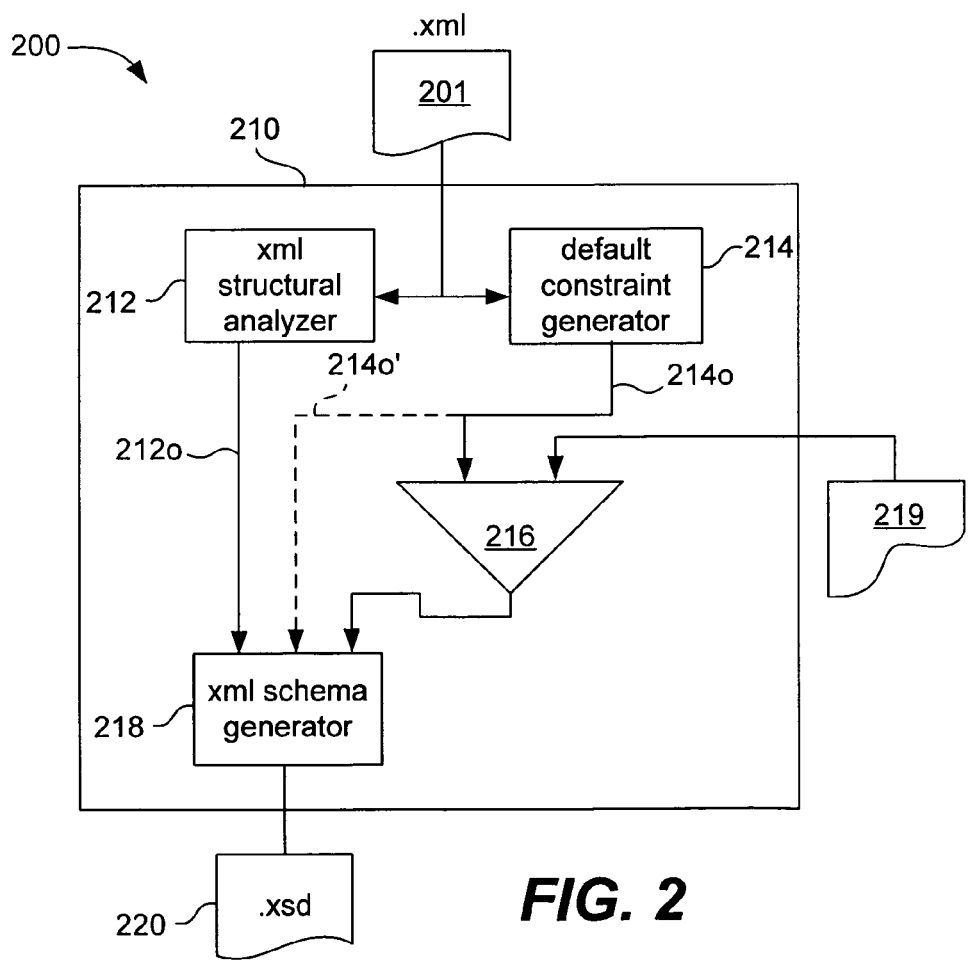
FIG. 2 is a simplified block diagram depicting one implementation of a system embodiment for automatically generating schema in accordance with the principles of the invention.

FIG. 2 depicts one implementation of a system 200 for automatically generating schema in accordance with the principles of the invention. In the depicted embodiment of the invention, the system can be implemented as a software module 202. As persons of ordinary skill will be aware, the system can be implemented in many other configurations. For example, the system can form part of an operating system, be implemented as part of an applications program, additionally, the system can be implemented as hardware. In accordance with some embodiments of the invention, the system is implemented as a software module 210 that can be employed to generate XML schema. As alluded to above, in one embodiment, the module can be employed as part of an application or as part of some other program. Additionally, as depicted here, in some embodiments the module 210 forms part of a computer system. The module 210 is configured to receive an XML file 201 and use the file 201 to generate an associated XML schema 220 that can be used to validate other XML files. Such validation can, for example, be used to validate other XML files intended for input into various application programs.

An XML document 201 containing XML data structures and associated XML data items (also referred to herein as raw XML data) is provided to the module 210. The module 210 includes an XML structure analyzer 212 capable of receiving an XML document and transforming the document into a data framework that defines the data structure for the XML document 201. Generally, the data framework comprises the arrangement and structure of the empty elements comprising the XML document 201. This framework information is output 212o to an XML schema generator 218. Additionally, the module can include a default constraint generator 214. The default constraint generator 214 is capable of receiving an XML document, identifying the data items of the XML document 201 and defining a set of properties for those data items. For example, one set of properties that can be identified and defined for the data items is the data types (e.g., string, numeric (e.g., integer, decimal, etc.), binary, boolean, date, time, anyURI, double, float, NOTATION, Qname, as well as many other "types") for each of the data items. These properties can be used to identify specific properties for each data item and can generate constraints for each data item. This constraint information is output from the default constraint generator 214 as a default constraint file 214o (e.g., as an XML file). The default constraint file 214o can be received by a constraint merger 216 which provides selected constraint information to the XML schema generator 218. The schema generator 218 uses the selected constraint information together with the data structure to translate an XML document 201 into an XML schema associated with the XML document 201. Additionally, a user can supply additional constraint information in the form of an externally generated constraint file 219 that is also input into the constraint merger 216. The constraint merger 216 can choose to select the default constraint file 214o or the externally generated constraint file 219 for input into the XML schema generator 218. Alternatively, the constraint merger 216 can merge the default constraint file 214o with the externally generated constraint file 219 for to generate an input for the XML schema generator 218.

Alternatively, the module 210 can be configured so that the default constraint file 214o is received directly by the schema generator 218 (see the dashed line 214o') without using the merger 216 and without the externally generated constraints 219. In such case no externally generated constraints 219 are used and the merger 216 is not required.

Figure 3:
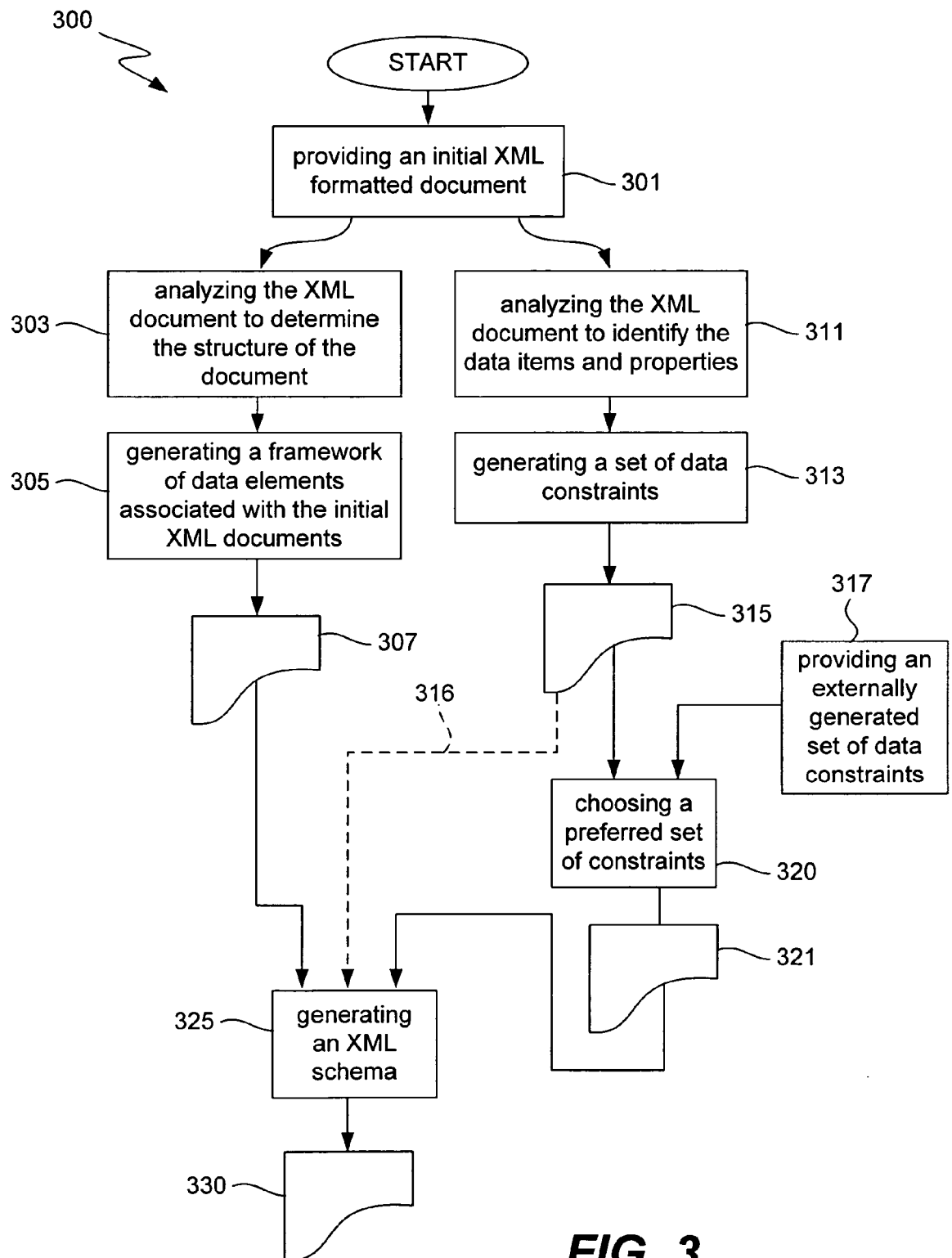
FIG. 3 is a flow diagram that describes one method embodiment of the invention.

FIG. 3 is a flow diagram that describes one typical method embodiment of the invention. The process flow 300 can begin by providing an initial XML document (Step 301). This document is typically a correctly formatted document that would be suitable for processing by the desired applications. For example, the XML document can be provided to a software module or other system embodied herein for generating an XML schema. The initial XML document is a properly formatted XML document configured in compliance with an XML format. The initial XML document typically includes. XML data structures and raw XML data (XML data items) that will be used in generating an associated XML schema. Providing the initial XML document generally includes providing the initial XML document to both an XML structure analyzer (e.g., 212) and an XML default constraint generator (e.g., 214). The initial XML document is analyzed to identify the XML structure of the document (Step 303). This can be accomplished using an XML structure analyzer (e.g., 212). The XML elements are identified and the relationships between the elements are discerned. A data structure framework associated with data elements of the initial XML document is then generated using the information obtained from the analysis of the initial XML document (Step 305). This framework typically defines a pattern of empty XML data elements configured in an arrangement analogous to that of the initial XML document. The output data structure framework 307 can be output as an XML document (XML.doc) for later use in the process.

The initial XML document is also analyzed to identify the XML data elements (raw XML data) of the document (Step 311). This can be done at the same time as steps 303, 305 or at a different time. Typically, this analysis can be accomplished using an XML default constraint generator (e.g., 214). The XML data items are identified and data properties pertaining to the data items are ascertained. For example, the data types for the data items are identified and the data attributes are also identified. A set of default data constraints is then generated for each data item (Step 313). The default data constraints are generated based on the data properties of the data items in the initial XML document. Commonly, the default data constraints include type and attribute information as well as other data property constraints. The output set of default data constraints 315 can also be output as an XML document. Example data constraints include but are not limited to attributes that indicate target information (i.e., an element or attribute to which the constraint has to be applied). For example, the type of target can be identified. In one example, target can be identified as type element (type="elem") or as type attribute (type="attr"). The name of the target can be identified (e.g., name="orderDate"). A pathname specifying a path of the target from the root (/) can be identified (e.g., path="/purchaseOrder"). In one limited example implementation attributes and elements can be constrained in accordance with the following example formats. In one example, attribute information can be constrained as follows: <constraint type="attr" name="orderDate" path="/purchaseOrder">. In another example, element information can be constrained as follows: <constraint type="elem" name="quantity" path="/purchaseOrder/items/item/quantity">. As can be appreciated by those of ordinary sill in the art many other constraint formats can be utilized and those shown are merely illustrative rather than limiting. In another example, a datatype element can hold default datatype information inside a type attribute, in one example, formatted as follows:

(e.g., <datatype type="xsd:string"> </datatype>).

As can be appreciated by those of ordinary skill in the art, many other constraint formats can be utilized and those shown above are merely intended to be illustrative rather than limiting.

In one embodiment, the output data structure framework 307 and the output set of default data constraints 315 are used to automatically generate a schema without any further user input beyond the introduction of the initial XML document (Step 325). In one embodiment, the output data structure framework 307 and the output default set of data constraints 315 (dashed line 316) are received by a schema generator (e.g., 218) and processed to automatically generate an XML schema 330 capable of validating XML files.

In another embodiment, an additional externally generated set of constraints can be provided (Step 317). An externally generated constraint file can be provided by a user (or generated by a machine in accordance with a predetermined set of conditions). For example, for a zip code constraint can be confined to a type=integer, but also constrained to only validate data items having five entries (i.e., "90505") or alternatively be constrained to validate data items having nine entries of the XXXXX-XXXX format (i.e., "90505-1405"). The externally generated set of constraints 317 and the default constraints 315 can be processed together to obtain a selected set of constraints (Step 320). In one instance, the two (or more) sets of constraints 315, 317 can be input into a constraint merger (e.g., 216) which can select either of the constraints to provide a selected output constraint 321 (typically in the form of an XML file) which is used with the output data structure framework 307 to automatically generate an XML schema 330 capable of validating XML files (Step 325). In a simple case, for example, a merger operating at Step 320 can simply select the set of constraints 315, 317 that is externally generated by a user (e.g., 317) as the selected output constraint 321.

In addition to the above approach, another embodiment can process the externally generated set of constraints 317 and the default constraints 315 together to obtain another selected set of constraints 321 (Step 320). In this case, the constraints 315, 317 can be input into a constraint merger (e.g., 216) which can merge the constraints 315, 317 to provide a selected output constraint 321 in the form of a merged file (typically in an XML format) that includes data from both files. This merged file is used with the output data structure framework 307 to automatically generate an XML schema 330 capable of validating XML files (Step 325). In a simple case, for example, the externally generated constraint information can be used to fill in any gaps in a default constraint document. Additionally, in conditions where constraint information in the default constraint file is in conflict with constraint information contained in the externally generated constraint file, conflicts can be resolved in accordance with a predetermined conflict resolution scheme. For example, a priority scheme can be implemented. Or the constraint information contained in an externally generated constraint file can be chosen over the default information.

The following discussion describes to one example embodiment of a structural analyzer (e.g., 212) and an associated mode of operation. In general, a structural analyzer reads an input XML document, analyzes the structure of the XML data elements, and generates a resultant XML document that contains structural information in the form of a framework. This framework is generally conceived of as comprising XML data elements, attribute information, and selected metadata concerning the cardinality of data elements and data attributes.

Figure 4:
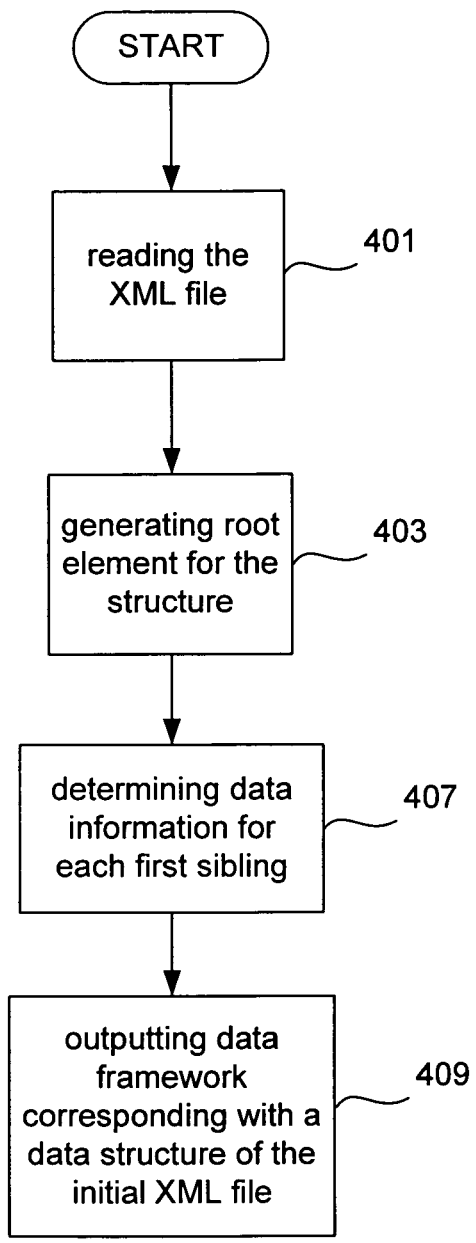
FIG. 4 is a flow diagram that describes one method embodiment for analyzing the structure of an XML file in accordance with one embodiment of the present invention.

FIG. 4 describes a simplified flow diagram 400 illustrating an example mode of operation for one embodiment of a structural analyzer (e.g., 212) operating to accomplish operations 303, 305 of FIG. 3.

The initial XML file is read (Step 401) and a "root element" is generated for the structure (Step 403). In one embodiment a system parser can be used to generate the root element. The "child" elements of the input XML file are identified (Step 405). Since "sibling" data elements have the same data format as other associated siblings (the exact content of the data can vary, but the data format is the same) only the first sibling need be analyzed to identify the data properties needed to specify the data format for any of the siblings. And since the purpose of the validation schema is to confirm that an input XML document has a correct format, such analysis of the first sibling is sufficient. Each first sibling can be processed to determine its name, attributes, number of attributes (attribute count), value, and element count (Step 407). Commonly, the redundant children need not be analyzed since they specify the same data format as the other related siblings. The resulting output is a data structure that captures the organizational format of the initial XML file (Step 409).

In one illustrative example, Table 1 provides an input initial XML file.

TABLE 1

```
<?XML version="1.0" encoding="UTF-8"?>
 <purchaseOrder orderDate="1999-10-20">
  <items>
   <item partNum="242-NO" >
    <productName>Nosferatu - Special Edition (1929)</productName>
    <quantity>5</quantity>
    <USPrice>19.99</USPrice>
   </item>
   <item partNum="243-NO" >
    <productName>The Mummy (1959)</productName>
    <quantity>3</quantity>
    <USPrice>19.98</USPrice>
   </item>
  </items>
 </purchaseOrder>
```

The initial XML file of Table 1 can be used to generate the following resultant framework (see, Table 2) for the data elements associated with the initial XML file.

TABLE 2

```
<purchaseOrder orderDate="1999-10-20" XSG_attrcount_orderDate="1"
XSG_count="1">
 <items XSG_count="1">
  <item partNum="242-NO" XSG_attrcount_partNum="2"
  XSG_count="2">
   <productName XSG_val="Nosferatu - Special Edition (1929)"
XSG_count="1"/>
```

TABLE 2-continued

```
    <quantity XSG_val="5" XSG_count="1"/>
    <USPrice XSG_val="19.99" XSG_count="1"/>
  </item>
 </items>
</purchaseOrder>
```

The root element is generated as, for example, purchaseOrder. The structure of the above framework includes: <purchaseOrder orderDate="1999-10-20" XSG_attrcount_orderDate="1" XSG_count="1"> to describe the element: "purchaseOrder" in its entirety.

For example, orderDate="1999-10-20" describes the attribute called orderDate. Also, XSG_attrcount_orderDate—describes the cardinality (number) of attribute orderDate for all elements of type purchaseOrder in the XML document. XSG_count="1" describes the cardinality of elements of type purchaseOrder in the XML document. The first data element for item partNumber (i.e., "242-NO") has been kept and defined. These same definitions and framework parameters apply to all other sibling data elements for item partNumber (e.g., "243-NO") which has already been defined as a framework element. Therefore, the item partNumber relating to "243-NO" need not be analyzed. The same sort of element definition is conducted for the other data elements e.g., productName; quantity, and USPrice.

FIG. 5 describes one embodiment of, for example, an XSLT style sheet that can be used to execute the process illustrated in FIG. 4 or the operate the structural analyzer (e.g., 212) executing operations 303, 305 or FIG. 3.

The stylesheet embodiment of FIG. 5 represents one approach to generating the structural framework of an initial XML document. As is known to those having ordinary skill in the art, many other approaches can be used. The embodiment of FIG. 5 begin by identifying a root (/) element of the input XML document and designates that element as the "current element". All of the "child" elements in the "current element" are processed and the first sibling is identified. The first sibling is then processed to generate an XML element containing, at least in this embodiment, the following information:

Name, here containing the element name of the first sibling (purchaseOrder);

Attributes (e.g., orderDate="1999-10-20");

Attribute count (i.e., cardinality information for each attribute). Example, shown here can include:
XSG_attrcount_orderDate="1"

Also, value (i.e., the value of text node elements, if present). For example, a value like: XSG_val="Nosferatu—Special Edition (1929)") for item productName.

Also, element count (the cardinality information for each element) can be discerned, here XSG_count="1". This process can be repeated for all first children until all elements (first children) of the initial XML file are visited. Such a process is one example of a process used to generate structural information in accordance with one embodiment of the invention.

Figure 6:
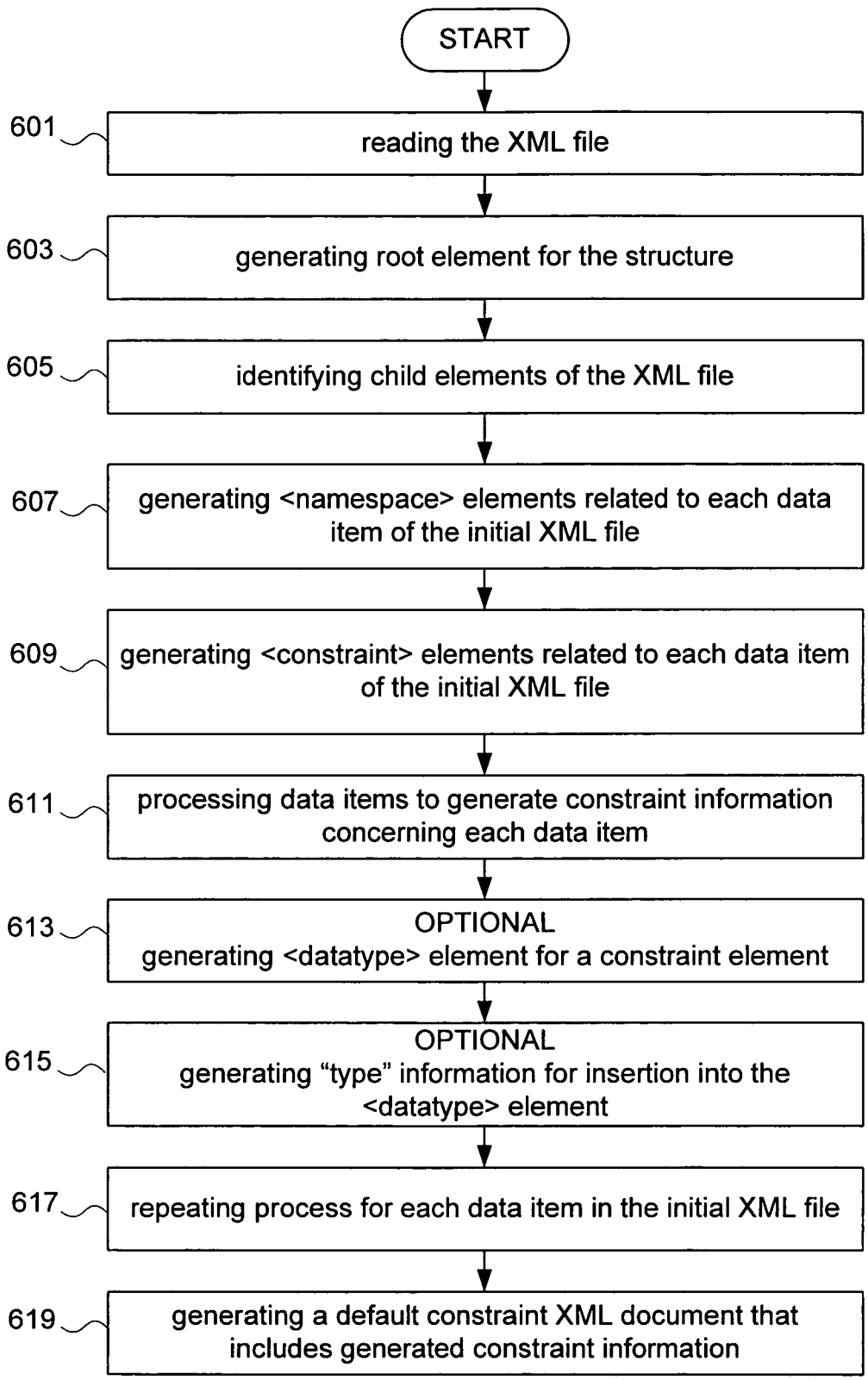
FIG. 6 is a flow diagram that describes one method embodiment for generating a set of default constraints from an initial XML document in accordance with one embodiment of the present invention.

As previously alluded to, the structure of the invention includes a default constraint generator. FIG. 6 describes a simplified flow diagram 600 illustrating an example mode of operation for one embodiment of a default constraint generator (e.g., 214) operating to accomplish operations 311, 313 of FIG. 3.

The initial XML file is read (Step 601) and a "root element" is generated for the structure (Step 603). In one embodiment, a system parser can be used to generate the root element. The "child" elements of the input XML file are identified (Step 605). Elements are generated to contain constraint information related to each data item of the initial XML file (Step 607). In one embodiment, these elements are referred to as <namespaces> elements. Each data item is then associated with a <namespace> data element. Additionally, each <namespace> element is configured to include a <constraint> element (Step 609) that includes constraint information concerning each data item. The data items of the initial XML file are processed to generate associated constraint information (Step 611). Each data item is analyzed to determine a "name" which identifies the item by name, analyzed to determine "attributes" which identify attributes of the data item, and analyzed to determine a "path" that identifies a pathname of the structure that identifies the pathname for the path of the element in the XML structure where the attribute or element belongs. Also, another element can be created for the constraint element (Step 613). This element can contain "type" information for the generated element. In one embodiment, such an element can be referred to, for example, as a "datatype" element. In such case the "type" element comprises a single attribute that is generated (Step 615) and whose value represents a generated data type from the initial XML file input into the default constraint generator. This process can be repeated for each data item in the initial XML file (step 617) to provide a complete characterization of the data items in the initial XML file an generate a default constraint XML document.

In general, the above process generates three blocks of information for use in a default constraint XML file. First a "namespaces" element can be generated from the input document. This element can be modified to change namespace information during generation an XML Schema (e.g., 218).

For example, having a "namespaces" element configured as follows:

```
<namespaces>
  <namespace value="http://java.sun.com/XML/ns/jaxb"
  name="XMLns:jaxb">
  </namespace>
</namespaces>
```

An additional namespace can be easily added by inserting the new namespace inside the "namespaces" element.

Also, data types can be easily modified in accordance with the principles of the invention. For example, the following constraint element is initially configured as follows:

```
<constraint type="attr" name="orderDate" path="/purchaseOrder">
  <datatype type="xsd:date">
  </datatype>
</constraint>
```

This describes a generated datatype as xsd:date for orderDate based on the "1999-10-20" content.

If a user desires to change the type for this attribute (datatype) to be xsd:time during XML Schema generation, then it can be changed, for example, as follows:

```
<constraint type="attr" name="orderDate" path="/purchaseOrder">
  <datatype type="xsd:time">
  </datatype>
</constraint>
```

This modified constraint can now be used for generating XML Schema document in accordance with the modified type information.

Furthermore, additional elements (comments, etc.) can easily be added in accordance with the principles of the invention. In one example implementation, the element insertion routine can be used to automatically introduce new elements into a schema without having to rewrite the schema by hand.

```
<insert path="/" name="comment_def">
    <xsd_element type="xsd:string" name="comment">
    </xsd_element>
</insert>
```

For example, the output XML file below is an example of an output default constraint generated using the initial XML file shown above in Table 1.

```
<?XML version="1.0" encoding="UTF-8"?>
<root>
  <namespaces>
    <namespace value="http://java.sun.com/XML/ns/jaxb"
name="XMLns:jaxb">
    </namespace>
  </namespaces>
  <constraints>
  <constraint type="attr" name="orderDate" path="/purchaseOrder">
    <datatype type="xsd:date">
    </datatype>
  </constraint>
  <constraint type="elem" name="productName"
path="/purchaseOrder/items/item/productName">
      <datatype type="xsd:string">
      </datatype>
    </constraint>
    <constraint type="elem" name="quantity"
path="/purchaseOrder/items/item/quantity">
      <datatype type="xsd:integer">
      </datatype>
    </constraint>
    <constraint type="elem" name="USPrice"
path="/purchaseOrder/items/item/USPrice">
      <datatype type="xsd:decimal">
      </datatype>
    </constraint>
  </constraints>
  <inserts>
    <insert path="/" name="comment_def">
      <xsd_element type="xsd:string" name="comment">
      </xsd_element>
    </insert>
  </inserts>
</root>
```

FIG. 7 describes one embodiment of, for example, an XSLT style sheet that can be used to execute the process illustrated in FIG. 4 or the operate the default constraint generator (e.g., 214) operating to accomplish operations 311, 313 of FIG. 3.

The following discussion describes a merger (e.g., 216) and an associated mode of operation. In general, a merger reads an input set of default constraint information (e.g., 214o) and an input set of externally supplied constraints (e.g., 219) and generates one of a merged set of constraints. Alternatively, the merger can select the default set of constraints or the externally supplied set of constraints for output to a schema generator (e.g., 218). In one implementation, the externally supplied constraints provide the primary constraint information with the default constraint information providing ancillary information.

Figure 8:
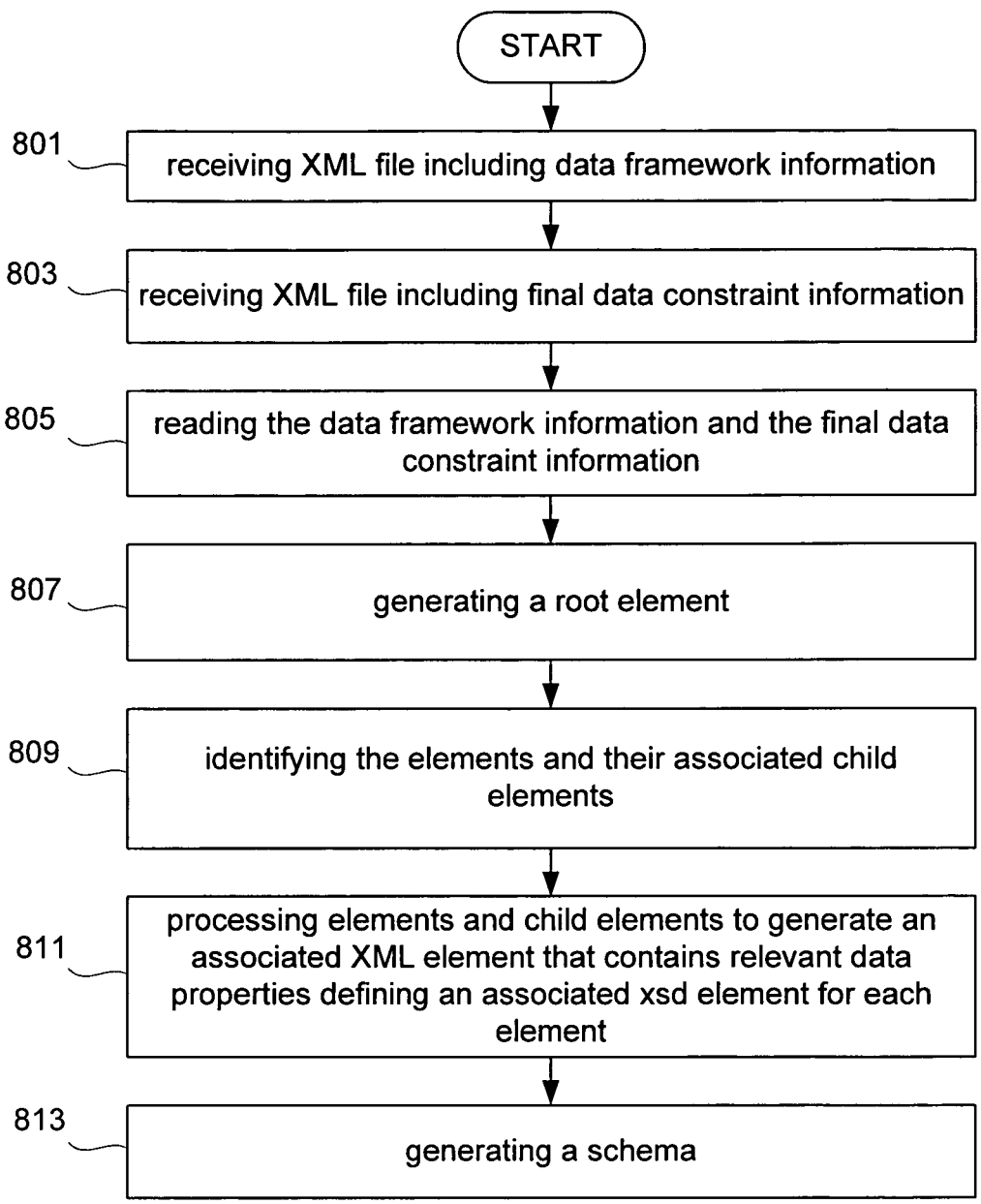
FIG. 8 describes a simplified flow diagram illustrating an example mode of operation for one embodiment of XML schema generation in accordance with the principles of the invention.

FIG. 8 describes a simplified flow diagram illustrating an example mode of operation for one embodiment of an XML schema generator (e.g., 218) operating to accomplish operation 325 of FIG. 3.

The following is a brief simplified description of schema generation in accordance with the principles of the invention, for example, using a schema generator (e.g., 218). The generated data framework 212o (e.g., in the form of an XML file) is received from the structural analyzer 212 (Step 801). At the same time, or at a different time, the final data constraint file (e.g., in the form of an XML file) can be received from the merger 216 (Step 803). The two files are read (Step 805) and a "root element" is generated for a schema (xsd file) (Step 807). Each of the elements and associated child elements are identified (Step 809). Each element (and child element) is processed to generate an XML element (or element set) that contains an associated set of elements (Step 811) to define an associate xsd element. If child elements contain further children (not siblings), such elements are "complex elements" and processed as such. For example, an xsd element is generated identifying the element having children as type complex elements (e.g., "xsd:complexType"). A fully constructed xsd (schema) file is then generated (Step 813).

Such processing (Step 811) typically involves scanning each element (and child element) to define and generate an XML schema element.

In a typical implementation, generating for example a complex element an accompanying "complexType" set (including a type declaration and complexType definition) is generated. In illustrative example the complex set of elements can include a declaration:

```
<xsd:element name="purchaseOrder" type="_purchaseOrder"/>
and can include a complexType definition:
    <xsd:complexType name="_purchaseOrder">
      <xsd:sequence>
        <xsd:element name="items" type="_items"/>
      </xsd:sequence>
      <xsd:attribute name="orderDate" type="xsd:date" use="required"/>
    </xsd:complexType>
```

In a simple element, a corresponding simple XML schema can be generated. In the following example (having child count=0) a declaration is defined. For example, <xsd:element name="productName" type="XYZ"/> where XYZ—could be of type (e.g., string; integer; decimal; boolean; date; time; etc.). Wherein "XYZ" is selected from an externally provided constraint document or from a generated default constraint XML document. A preference can be given to the externally provided constraint XML document types if they have been supplied. Additionally, if the element includes attributes, it can be configured, for example as follows:

```
<xs:element name="item">
  <xs:complexType>
    <xs:attribute name="partNum" type="xs:string"/>
  </xs:complexType>
</xs:element>
```

It should be noted, that the examples provided above are intended as simplified examples used to illustrate certain principles of the invention. As such they are not intended to confine the scope or implementations of the invention. As is known to those having ordinary skill in the art, many other related implementation details can be implemented to accomplish the embodiments of the invention.

One example of a fully operative embodiment for accomplishing such schema generation is depicted by the stylesheet of FIG. 9.

It should be noted that all the processes, methods, and systems described herein can be implemented in many different kinds of tools. Examples, include but are not limited to command-line tools and servlets. Also, the principles of the invention can be applied to ANT assembly language programming (e.g., Ant 3.0.1) and other build tools. Also, the inventor contemplates the application of the principles of the present invention to JAVA Studio IDE NBM modules. The processes described herein are well suited to implementation in computer readable medium implementations. Also, the principles of the present invention are well suited to network based computer systems. For example, an XML document on one computer provided over the internet to a remote computer can be converted to an XML schema on the remote computer for remote use or for return and use on the sending computer.

Figure 10A:
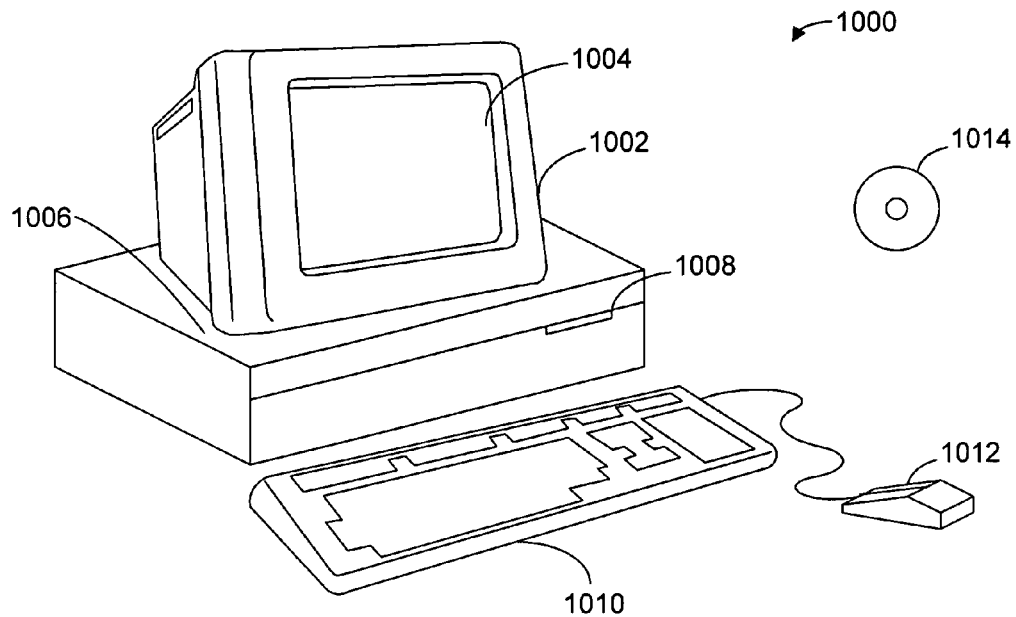
FIGS. 10A and 10B illustrate an example of a computer system that may be used in accordance with the invention.
Figure 10B:
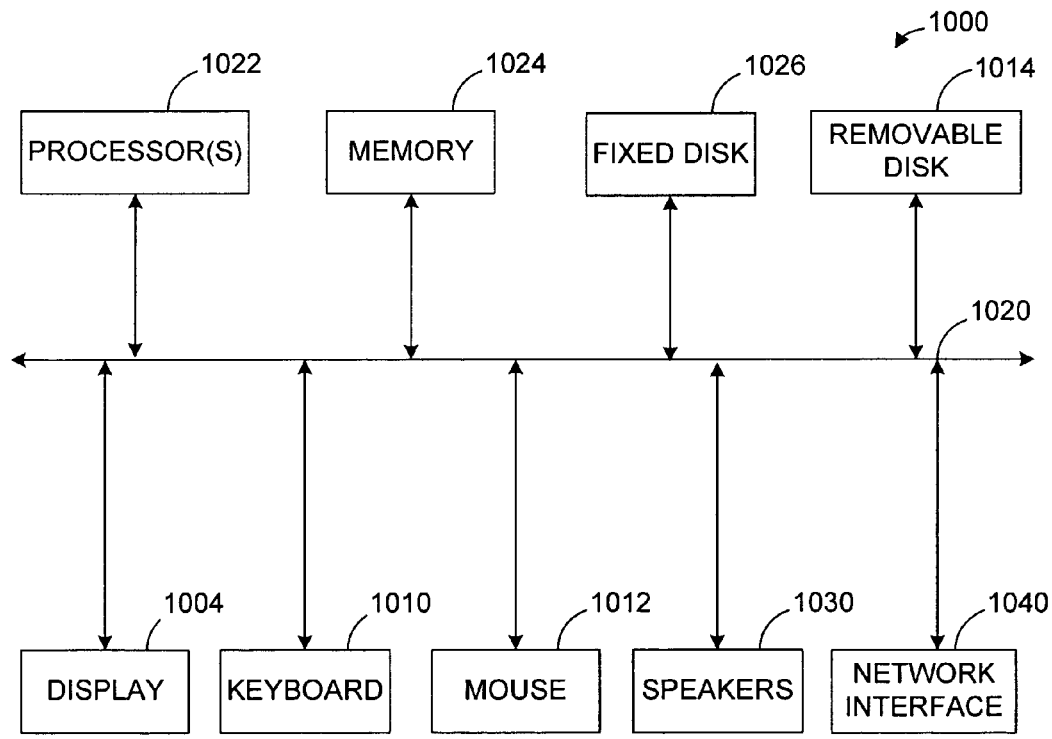

FIGS. 10A and 10B illustrate an example of a multi-processor computer system 1000 that may be used in accordance with the invention. FIG. 10A shows a computer system 1000 that includes a display 1002, screen 1004, cabinet 1006, keyboard 1010, and mouse 1012. Mouse 1012 may have one or more buttons for interacting with a graphical user interface. Cabinet 1006 can house a CD-ROM drive 1008, system memory and a hard drive (see FIG. 10B) which may be utilized to store and retrieve software programs incorporating computer code that implements the invention, data for use with the invention, and the like. Although CD-ROM 1008 is shown as an exemplary computer readable storage medium, other computer readable storage media including floppy disk, DVD, tape, memory sticks, flash memory, system memory, and hard drive may be utilized. Additionally, a data signal embodied in a carrier wave (e.g., in a network including the Internet) may be the computer readable storage medium. In one implementation, an operating system for the computer system 1000 is provided in the system memory, the hard drive, the CD-ROM 1008 or other computer readable storage medium and serves to incorporate the computer code that implements the invention (e.g., MMU system). It is to be remembered that the operating system is configured so it controls all of the processors of the system. It should be noted that other devices (e.g., printers, scanners, etc.) may be present in the computer system 1000.

FIG. 10B shows a system block diagram of computer system 1000 used to execute the software of an embodiment of the invention. The computer system 1000 includes monitor 1004, keyboard 1010, and mouse 1012. Computer system 1000 further includes subsystems, such as a plurality of central processors (CPU's) 1022 (including cache memory resources), system memory 1024, fixed storage 1026 (e.g., hard drive), removable storage 1014 (e.g., CD-ROM drive), display adapter, sound card and speakers 1030, and network interface 1040. The central processors 1051, for example, can execute computer program code (e.g., an operating system) to implement the invention. An operating system is normally (but not necessarily) resident in the system memory 1024 during its execution. Other computer systems suitable for use with the invention may include additional or fewer subsystems. Importantly, the principles of the invention can specifically be implemented on networked computer systems having many individual computers. Such networked systems can include local area networks (LAN's) or a wide area network (WAN's). Particularly, the inventors contemplate computer systems networked together using the Internet. Additionally, an example of a LAN is a private network used by a mid-sized company with a building complex. Publicly accessible WAN's include the Internet, cellular telephone network, satellite systems and plain-old-telephone systems (POTS). Examples of private WAN's include those used by multi-national corporations for their internal information system needs. The network may also be a combination of private and/or public LANs and/or WANs.

The system bus architecture of computer system 1000 is represented by arrows 1020. However, these arrows are illustrative of any interconnection scheme serving to link the subsystems. For example, a local bus could be utilized to connect the central processor to the system memory and display adapter. Computer system 1000 shown in FIG. 10B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The advantages of the invention are numerous. Different embodiments or implementations may have one or more of the following advantages. One advantage of the invention is that it can be used in a networked computing environment, to include, but not limited to a web-based network. XML documents can be remotely accessed to generate schema. Additionally, the components of the inventive system can be operated in a distributed fashion if desired. For example, an XML structure analyzer can be located on one computer and a default constraint generator can be located on another networked computer. In another implementation, an XML documents can be provided from one networked computer to a complete module located on yet another networked computer.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for generating XML schema comprising:
providing an initial XML document that includes raw XML data comprising data items arranged in XML data elements;
analyzing a structure of a portion of the XML data elements in the initial XML document;
generating a data framework that defines a pattern of empty XML data elements based on the structure of the portion of analyzed XML data elements, the XML data elements configured in an arrangement analogous to the initial XML document;
analyzing the data items from the initial XML document;
determining data constraints based on the data items;
generating an XML schema based on the data framework generated and the data constraints determined from the raw XML data; and
changing at least one data type for the XML schema.

2. The method of claim 1, wherein determining the data constraints based on the data items includes determining type constraints based on a type of the data items in the initial XML document.

3. The method of claim 1, wherein determining the data constraints based on the data items includes determining attribute constraints based on attributes of the data items in the initial XML document.

4. The method of claim 1, wherein the method can be implemented to change namespace for the XML schema.

5. A method for generating XML schema comprising:
providing an initial XML document that includes raw XML data comprising data items arranged in XML data elements;
analyzing a structure of a portion of the XML data elements in the initial XML document;
generating a data framework that defines a pattern of empty XML data elements based on the structure of the portion of analyzed XML data elements, the XML data elements configured in an arrangement analogous to the initial XML document;
analyzing the data items from the initial XML document;
determining data constraints based on the data items;
generating an XML schema based on the data framework generated and the data constraints determined from the raw XML data; and
at least one of adding and removing a data element from the XML schema.

6. A method for generating XML schema comprising:
providing an initial XML document that includes raw XML data comprising data items arranged in XML data elements;
analyzing a structure of a portion of the XML data elements in the initial XML document;
generating a data framework that defines a pattern of empty XML data elements based on the structure of the portion of analyzed XML data elements, the XML data elements configured in an arrangement analogous to the initial XML document;
analyzing the data items from the initial XML document;
determining data constraints based on the data items, including receiving externally supplied data constraints; and
generating an XML schema based on the data framework generated and the data constraints determined from the raw XML data.

7. The method of claim 6, wherein generating the schema further includes using the externally supplied data constraints to generate the XML schema.

8. The method of claim 6, wherein generating the schema further includes merging portions of the data constraints determined from the data in the XML document and portions of the externally supplied data constraints.

9. A non-transitory computer program product embodied on a computer readable media including computer program code form generating XML schema, the computer product including:
computer program code instructions for receiving an initial XML document that includes raw XML data comprising data items arranged in XML data elements;
computer program code instructions for analyzing a structure of a portion of the XML data elements in the initial XML document;
computer program code instructions for generating a data framework that defines a pattern of empty XML data elements based on-the structure of the portion of analyzed XML data elements, the XML data elements configured in an arrangement analogous to the initial XML document;
computer program instructions for analyzing the data items from the initial XML document and determining XML data constraints based on the data items and receipt of externally supplied data constraints; and
computer program code instructions for generating an XML schema based on the data framework generated and the data constraints determined from the data items.

10. The non-transitory computer program product of claim 9, wherein the computer program code instructions for generating the schema further includes using the externally supplied data constraints to generate the XML schema.

11. The non-transitory computer program product of claim 9, wherein the computer program code instructions for determining data constraints includes computer program code instructions for receiving externally supplied data constraints; and
further comprising computer program code instructions for using the externally supplied data constraints to generate the XML schema.

12. The non-transitory computer program product of claim 9, wherein the computer program code instructions for determining data constraints includes computer program code instructions for receiving externally supplied data constraints; and
wherein the computer program code instructions for generating the schema further includes instructions for merging portions of the data constraints determined from the data in the initial XML document and portions of the externally supplied data constraints.

13. A computer system comprising:
at least one central processing unit (CPU), memory, and user interface in combination configured to include:
XML structure analyzer for analyzing a received initial XML document that includes raw XML data comprising data items arranged in XML data elements, wherein said analyzing includes identifying analyzing a structure of a portion of the XML data elements in the initial XML document and generating a data framework that defines a pattern of empty XML data elements based on-the structure of the portion of analyzed XML data elements, the XML data elements configured in an arrangement analogous to the initial XML document;
default constraint generator for analyzing the data items from the initial XML document and determining XML data constraints based on the XML raw data;
data constraint merger for receiving at least one of the XML data constraints from the data constraint generator and a set of externally supplied data constraints and for outputting a final data constraint file; and
XML schema generator for receiving from the XML structure analyzer and final data constraint file from the data constraint merger and generating an XML schema associated with said XML data elements and final data constraint file.

14. The computer system of claim 13 wherein the data constraint merger receives both the XML data constraints from the data constraint generator and the set of externally supplied data constraints and merges both sets of data constraints into the final constraint file.

15. The computer system of claim 13 wherein the data constraint merger receives both the XML data constraints from the data constraint generator and the set of externally supplied data constraints and selects one of the XML data constraints from the data constraint generator and the set of externally supplied data constraints for output as the final data constraint file.

16. A computer module for automatically generating XML schema, the module comprising:

XML structure analyzer for analyzing a received initial XML document that includes raw XML data comprising data items arranged in XML data elements, wherein said analyzing includes analyzing a structure of a portion of the XML data elements in the initial XML document and generating a data framework that defines a pattern of empty XML data elements based on-the structure of the portion of analyzed XML data elements, the XML data elements configured in an arrangement analogous to the initial XML document;

default constraint generator for analyzing the data items from the initial XML document and determining XML data constraints based on the XML raw data;

data constraint merger for receiving at least one of the XML data constraints from the data constraint generator and a set of externally supplied data constraints and for outputting a final data constraint file; and XML schema generator for receiving the data structures from the XML structure analyzer and final data constraint file from the data constraint merger and generating an XML schema associated with said data structures and final data constraint file.

17. The computer module of claim 16 wherein the data constraint merger receives both the XML data constraints from the data constraint generator and the set of externally supplied data constraints and merges both sets of data constraints into the final data constraint file.

18. The computer module of claim 16 wherein the data constraint merger receives both the XML data constraints from the data constraint generator and the set of externally supplied data constraints and selects one of the XML data constraints from the data constraint generator and the set of externally supplied data constraints for output as the final data constraint file.

* * * * *